(12) United States Patent
Franzo

(10) Patent No.: US 12,051,033 B2
(45) Date of Patent: Jul. 30, 2024

(54) TECHNIQUES FOR VERIFYING THE STATE OF AN ITEM DURING TRANSIT

(71) Applicant: QUALCOMM Incorporated, San Diego, CA (US)

(72) Inventor: Robert Thomas Franzo, Northport, MI (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/399,487

(22) Filed: Aug. 11, 2021

(65) Prior Publication Data

US 2022/0051183 A1 Feb. 17, 2022

Related U.S. Application Data

(60) Provisional application No. 63/064,801, filed on Aug. 12, 2020.

(51) Int. Cl.
*G06Q 10/0833* (2023.01)
*G06N 20/00* (2019.01)

(52) U.S. Cl.
CPC ......... *G06Q 10/0833* (2013.01); *G06N 20/00* (2019.01)

(58) Field of Classification Search
CPC .............................. G06Q 10/0833; G06N 20/00
See application file for complete search history.

(56) References Cited

U.S. PATENT DOCUMENTS

| 2014/0222522 | A1* | 8/2014 | Chait ................ G06Q 10/0637 705/7.36 |
| 2016/0239790 | A1* | 8/2016 | Burch, V ............ G06Q 10/083 |
| 2021/0312381 | A1* | 10/2021 | Iyer ........................ G16Y 20/10 |

OTHER PUBLICATIONS

Confidence levels of measurement based decisions, van der Grinten, 2003, p. 1 (Year: 2003).*
International Search Report and Written Opinion—PCT/US2021/045669—ISA/EPO—Dec. 14, 2021.

* cited by examiner

*Primary Examiner* — Ibrahim N El-Bathy
(74) *Attorney, Agent, or Firm* — QUALCOMM Incorporated

(57) ABSTRACT

Techniques described herein are directed to verifying a state of an item during transit. In some embodiments, shipment data including sensor data and/or user input may be obtained by one or more sensor(s) and/or input device(s) of a shipping container (e.g., box, conveyance, custom container, receptacle, smart container, tote) that houses the item during transit. Shipment data may be transmitted to a data store (e.g., blockchain, immutable ledger, distributed ledger technology). At suitable time(s), the location of the shipping container may be estimated and/or identified from the shipment data obtained from the data store. A state of the item may be verified at least in part by analyzing the sensor data and/or user input obtained from the data store. Utilizing the techniques herein, a determination may be made as to whether the item was mishandled and a likelihood that the item was affected (e.g., damaged, spoiled, etc.) during transit.

39 Claims, 5 Drawing Sheets

TECHNIQUES FOR VERIFYING THE STATE OF AN ITEM DURING TRANSIT

CROSS-REFERENCE TO RELATED APPLICATIONS

This application claims the benefit of priority to U.S. Provisional Application No. 63/064,801, filed Aug. 12, 2020, entitled "TECHNIQUES FOR ASSESSING AND VERIFYING THE STATE OF AN ITEM DURING TRANSIT" which is incorporated herein by reference in its entirety.

BACKGROUND

The present disclosure generally relates to the field of wireless communications, particularly signal communications among objects, devices, and a data storage system (including decentralized data storage).

Supply chain management has become increasingly important as many consumers are moving to ordering more and more items online. Shipments of all varieties are currently tracked by scanning bar codes on receipt and/or transfer of packages at various warehouses and delivery locations. However, little to no information is known about how the shipment was handled during transit.

BRIEF SUMMARY

Techniques described herein provide for verifying the state of an item during transit. For example, techniques disclosed herein can provide a likelihood that the item was mishandled or handled properly during the transit period. If mishandled, a likely outcome (e.g., the item is likely damaged and/or spoiled, etc.) may be identified. In some embodiments, the location of the item may be ascertained and reported by the shipping container (e.g., box, conveyance, custom container, receptacle, smart container, tote, etc.) itself and such location data may be accessible to various entities (e.g., a user associated with a destination location, a supplier, a shipping entity, etc.) during and/or after the transit period. The techniques discussed herein address these and other operational improvements, including the trustworthiness of the state of the item.

Some embodiments may include a method for verifying a state of an item during transit. The method may comprise obtaining, by a processor of an apparatus configured for transit from a first sensor of the apparatus, a first measurement, the apparatus housing the item during transit. The method may further comprise transmitting, by the processor to a remote data store, the first measurement and a first trust value corresponding to the first measurement. The method may further comprise obtaining, by the processor, user input related to a second measurement associated with the apparatus. The method may further comprise transmitting, by the processor to the remote data store, the second measurement and a second trust value corresponding to the second measurement, the second measurement being determined, at least in part, from the user input. The method may further comprise determining that the apparatus has reached a destination. The method may further comprise verifying the state of the item during transit conforms to a set of predefined conditions based at least in part on the first measurement, the first trust value, the second measurement, and the second trust value.

Some embodiments may include an apparatus configured for transit. The apparatus may comprise one or more sensors, a memory storing executable instructions for verifying a state of an item during transit, and one or more processors communicatively coupled with the memory. In some embodiments, the one or more processors are configured to execute the instructions to cause the computing device to perform operations. The operations may comprise obtaining, from a first sensor of the apparatus, a first measurement, the apparatus housing the item during transit. The operations may further comprise transmitting, to a remote data store, the first measurement and a first trust value corresponding to the first measurement. The operations may further comprise obtaining user input related to a second measurement associated with the apparatus. The operations may further comprise transmitting, to the remote data store, the second measurement and a second trust value corresponding to the second measurement, the second measurement being determined, at least in part, from the user input. The operations may further comprise determining that the apparatus has reached a destination. The operations may further comprise verifying the state of the item during transit conforms to a set of predefined conditions based at least in part on the first measurement, the first trust value, the second measurement, and the second trust value.

Some embodiments may comprise a non-transitory computer-readable medium. The non-transitory computer-readable medium may comprise stored instructions for verifying a state of an item during transit. In some embodiments, the instructions, when executed by one or more processing units, cause the one or more processing units to perform operations. The operations may comprise obtaining, from a first sensor of an apparatus configured for transit, a first measurement, the apparatus housing the item during transit. The operations may further comprise transmitting, to a remote data store, the first measurement and a first trust value corresponding to the first measurement. The operations may further comprise obtaining user input related to a second measurement associated with the apparatus. The operations may further comprise transmitting, to the remote data store, the second measurement and a second trust value corresponding to the second measurement, the second measurement being determined, at least in part, from the user input. The operations may further comprise determining that the apparatus has reached a destination. The operations may further comprise verifying the state of the item during transit conforms to a set of predefined conditions based at least in part on the first measurement, the first trust value, the second measurement, and the second trust value.

Some embodiments may include an apparatus configured to verify a state of an item during transit. The apparatus may comprise means for obtaining, from a first sensor of the apparatus, a first measurement, the apparatus housing the item during transit. The apparatus may further comprise means for transmitting, to a remote data store, the first measurement and a first trust value, the first trust value corresponding to the first measurement. The apparatus may further comprise means for obtaining user input related to a second measurement associated with the apparatus. The apparatus may further comprise means for transmitting, to the remote data store, the second measurement and a second trust value corresponding to the second measurement, the second measurement being determined, at least in part, from the user input. The apparatus may further comprise means for determining that the apparatus has reached a destination. The apparatus may further comprise means for verifying the state of the item during transit conforms to a set of predefined conditions based at least in part on the first measurement, the first trust value, the second measurement, and the second trust value.

Figure 1:
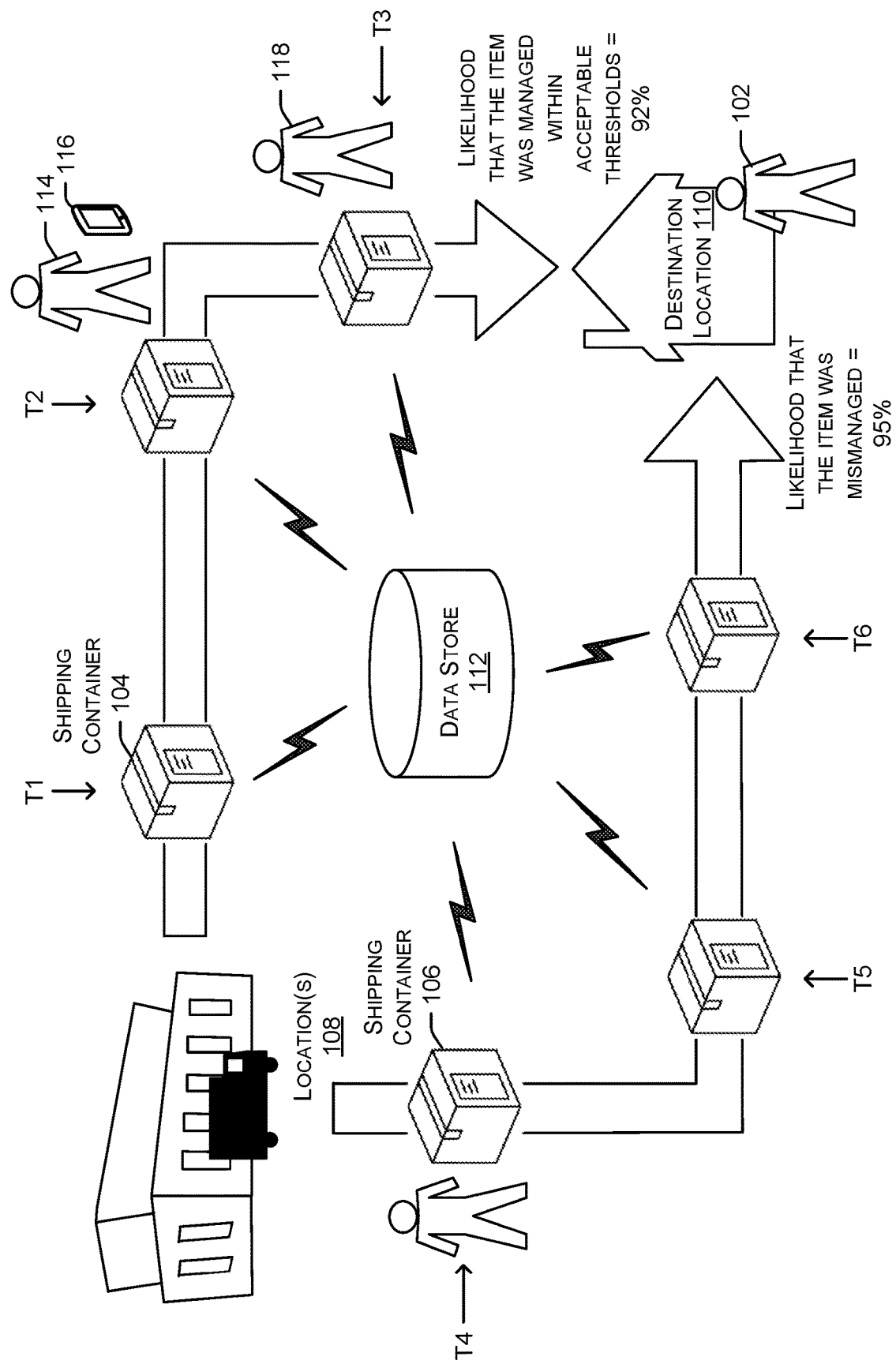
FIG. 1 is a simplified block diagram that illustrates a method for verifying the state of an item during transit, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

In some embodiments, the state of an item during transit (e.g., during a transit period including the time elapsed from a pickup at a starting location to delivery at the intended destination) may be verified. By way of example, a user can order an item online. To fulfill the order, the item may be shipped (e.g., by a shipping provider) to the user. In some embodiments, an apparatus such as a shipping container (e.g., box, conveyance, custom container, receptacle, smart container, tote, etc.) storing the item during transit (sometimes referred to as "a smart container") may include one or more sensors with which various measurements may be taken and/or attributes of the shipping container and/or the item may be ascertained during the journey. For example, a temperature sensor may be utilized to measure the temperature within the shipping container over time during transit. A light sensor may be utilized to identify when and if the shipping container is opened during the transit period. The shipping container may include sensor for determining location such as a Global Navigation Satellite System (GNSS) receiver. The GNSS receiver may be configured to receive and digitally process signals from a navigation satellite (and/or other vehicles) in order to provide position, velocity, and time of receipt. The GNSS receiver, or another positioning sensor, may be utilized to determine the shipping containers location at various times throughout the transit period. One or more accelerometer(s) and/or gyroscope(s) may be utilized to identify the orientation and/or physical handling of the item over time. Usage of a myriad of sensors is contemplated and discussed herein. The shipping container and/or one or more of the sensor(s) may include one or more processors and/or one or more communication devices (e.g., wireless and/or cellular transmitters) with which data collected by the sensor(s) may be wirelessly transmitted by the shipping container and/or the sensor itself.

These, and other measurements and/or attributes of the shipping container and/or item may be transmitted with a trust value to a remote system (e.g., a system that manages an immutable ledger such as a blockchain network) for storage. A blockchain network may include one or more computing devices that manage a blockchain. A blockchain refers to a distributed, decentralized, and immutable public ledger of data blocks, where each block includes a hash that uniquely identifies the block and a hash of the previous block. The trust value (e.g., a value between 0 and 1, between 0 and 100, etc.) can quantify a degree of trust that the measurement and/or attribute is accurate and/or trustworthy.

In some embodiments, human intervention may be necessary to determine some types of shipping data (e.g., measurements and/or attributes of the shipping container and/or item). For example, a user may be utilized to provide information regarding the dimensions and/or state of the shipping container (e.g., whether or not dents or tears are visible, the approximate size of damage to the shipping container, or the like). In some embodiments, the user may provide this data via an interface of the shipping container and/or via a user device operated by the user. As another example, a user may be utilized to identify (e.g., via a camera and input device of a user device) where the shipping container edge occurs in an image (e.g., an image of the shipping container as captured by the user device). These measurement(s) and/or attribute(s) that utilize, at least in part, some amount of human intervention may also be assigned a trust value and the combination of the data may be stored at the remote system. In some embodiments, measurements and/or attributes collected solely by a computing device (e.g., any suitable combination of the one or more sensor, may be assigned a higher trust value than data that was, at least in part, obtained through human intervention.

At any suitable time (e.g., at delivery time), the shipping container and/or a service provider computer may access the shipping data (e.g., the measurements and/or attributes and corresponding trust values obtained at various times during the transit period from shipment initiation to delivery). For example, the shipping container and/or the service provider computer may obtain the shipping data from a blockchain where the data was previously stored. The shipping data may be utilized to determine whether the measurements and/or attributes of the shipping container and/or item were maintained within acceptable parameters. In some embodiments, a smart contract may be stored in the blockchain and used to verify the state of the item during transit. A smart contract may include a computer program and/or a transaction protocol that may be executed (e.g., automatically executed, executed on demand, etc.) to verify that the measurements and/or attributes of the shipping container and/or item were maintained within acceptable parameters during transit.

By way of example, the shipping data temperature measurements may be utilized to calculate a temperature score (e.g., indicating a likelihood that the temperature within the shipping container was outside an acceptable temperature range exceeding an acceptable period of time during the transmit period). The various measurements and attributes may be analyzed as a whole to identify whether the shipping container and/or item was subjected to unacceptable treatment and/or conditions (accordingly to a predefined set of rules) during the transit period. For example, some measurements (e.g., dimensions of the shipping container box, indications that the shipping container includes holes and/or tears, accelerometer and/or gyroscope measurements, and/or measurements from piezoelectric sensors (e.g., strain sensors) indicating various positions and/or forces acting on the shipping container and/or item over time, and the like) may be utilized to identify a likelihood that the shipping container and/or item sustained an unacceptable amount of damage (an amount of damage exceeding a predefined damage threshold) due to an amount of force exceeding a predetermined threshold. As another example, some measurements (e.g., obtained by one or more light sensors) may be utilized to determine whether the shipping container was opened and/or whether the item within the shipping container was subjected to light. In some embodiments, the item within the shipping container may be light sensitive and the indication that the shipping container was opened and/or the item was subjected to light may indicate an unacceptable condition (a condition that is outside a set of predefined conditions associated with the item). In some embodiments, the trust values corresponding to each measurement and/or attribute may be utilized according to a predetermined weighting scheme to weight the data accordingly such that data with a higher trust value is utilized more heavily than data corresponding to a lower trust value. Acceptable ranges and thresholds may be predefined according to the item being shipped and/or shipping container being utilized. The calculations, determinations, and analysis discussed above may be executed by a computing device and/or a smart contract of the blockchain.

Utilizing the disclosed techniques may enable tracking and delivery notifications to be automatically provided by the shipping container itself. Additionally, the conditions and treatment of the item may be monitored, tracked, or otherwise ascertained to enable a determination of whether the item has been damaged, spoiled, deviated from an intended transit route, and the like.

FIG. 1 is a simplified block diagram that illustrates an environment 100 for verifying the state of an item during transit, according to an embodiment. Respective items may be contained in shipping container. User 102 may purchase and/or lease various items from an item supplier (e.g., an online retailer, a medical provider, a grocery provider, etc.). The items may be shipped to the user 102 within the shipping container 104 and the shipping container 106. In some embodiments, the items may initially be stored at location(s) 108 (e.g., the same or different warehouses, supply facilities, storage locations, and the like).

During a transit period including the time of order to the time of delivery at the destination location 110, various measurements and/or attributes of the shipping container (and/or the item) may be collected (e.g., by one or more sensors of the shipping containers, via the aid of a supply chain agent such as a warehouse worker and/or delivery agent, etc.). These measurement and/or attributes may be transmitted (e.g., by the shipping container and/or a user device operated by the supply chain agent to data store 112, or another device in communications with the shipping container and/or user device) to the data store 112. Each measurement and/or attribute may be assigned a trust value indicating a degree of accuracy and/or trustworthiness of the data. In some embodiments, measurements and/or attributes obtained autonomously by one or more sensors and/or devices may be trusted more heavily than data obtained utilizing, at least in part, human intervention. The various measurements and attributes corresponding to a shipment may be analyzed as a whole to identify whether the shipping container and/or item was subjected to unacceptable treatment and/or conditions during the transit period and/or to track the shipping container and/or item and condition of the shipping container and/or item during the transit period. In some embodiments, the analysis discussed above may be executed by a computing device and/or a smart contract.

By way of example, shipping container 104 may be utilized to transport an item from location(s) 108 to destination location 110 (e.g., user 102's residence). At time T1, the shipping container 104 may be received at a transit terminal (e.g., a receiving center along the path to destination location 110). The shipping container 104 may include any suitable number of sensors, at least one of which may include positioning sensors (e.g., a GNSS receiver) and/or an accelerometer and/or gyroscope configured to measure motion and/or placement/orientation of the shipping container. Upon identifying (e.g., via the accelerometer and/or gyroscope) that the shipping container 104 has ceased motion for a period of time, one or more sensors of the shipping container 104 may be utilized to collect sensor data (e.g., data including one or more measurements and/or attributes of the shipping container and/or the item). The sensor data may be assigned (e.g., by a processor of the sensor, by a processor of the shipping container 104, etc.) a trust value indicating a degree of accuracy and/or trustworthiness of the sensor data. In some embodiments, the sensor(s) and/or the shipping container 104 may be configured with a predefined protocol (e.g., a set of rules) for assigning trust values.

In some embodiments, the sensor(s) and/or the shipping container 104 may utilize a machine-learning model that can output, among other things, a confidence score indicating a degree of confidence of the model has with respect to its output. The machine-learning model may be previously trained utilizing any suitable supervised, unsupervised, semi-supervised, and/or reinforced learning algorithms and stored in memory at the shipping container 104 and/or in memory of the sensor(s) of the shipping container. According to some embodiments, different sensors may include the same or different machine-learning models, each model may be configured to provide determinations and/or predictions from input data based on features learned from historic examples of a training data set.

By way of example, a light sensor (e.g., a sensor that measures an amount of light exposure) may be configured with a machine-learning algorithm that has been previously trained (e.g., from historic example sets of sensor data individually associated with a determination that the shipping container was opened/not opened and/or whether the item was exposed to light/not exposed to light) to identify whether a shipping container has been opened and/or the item was exposed to light based on one or more light measurements provided by other light sensors of other shipping containers. As the light sensor is used to collect sensor data (e.g., light measurements), the sensor data may be provided to the machine-learning model as input and an output (e.g., a determination of whether the shipping container has been opened and/or the and a confidence score indicating a degree of confidence the model has with respect to this output) may be received.

In some embodiments, the shipping container 104 (or the collecting sensor(s)) may transmit the sensor data along with the corresponding trust values (whether assigned according to a predetermined protocol or as determined by a machine-learning model) to the data store 112. In some embodiments, the data store 112 is a decentralized and distributed public ledger (e.g., a blockchain), or the data store 112 may be any suitable storage device accessible to the shipping container 104. In some embodiments, the data store 112 may store a smart contract (not depicted) that may be utilized to analyze the shipping data (e.g., measurements and/or attributes of the shipping container and/or item) to verify the state of an item during transit (e.g., to verify that the measurements and/or attributes of the shipping container and/or item were an acceptable value and/or within an acceptable range).

Figure 2:
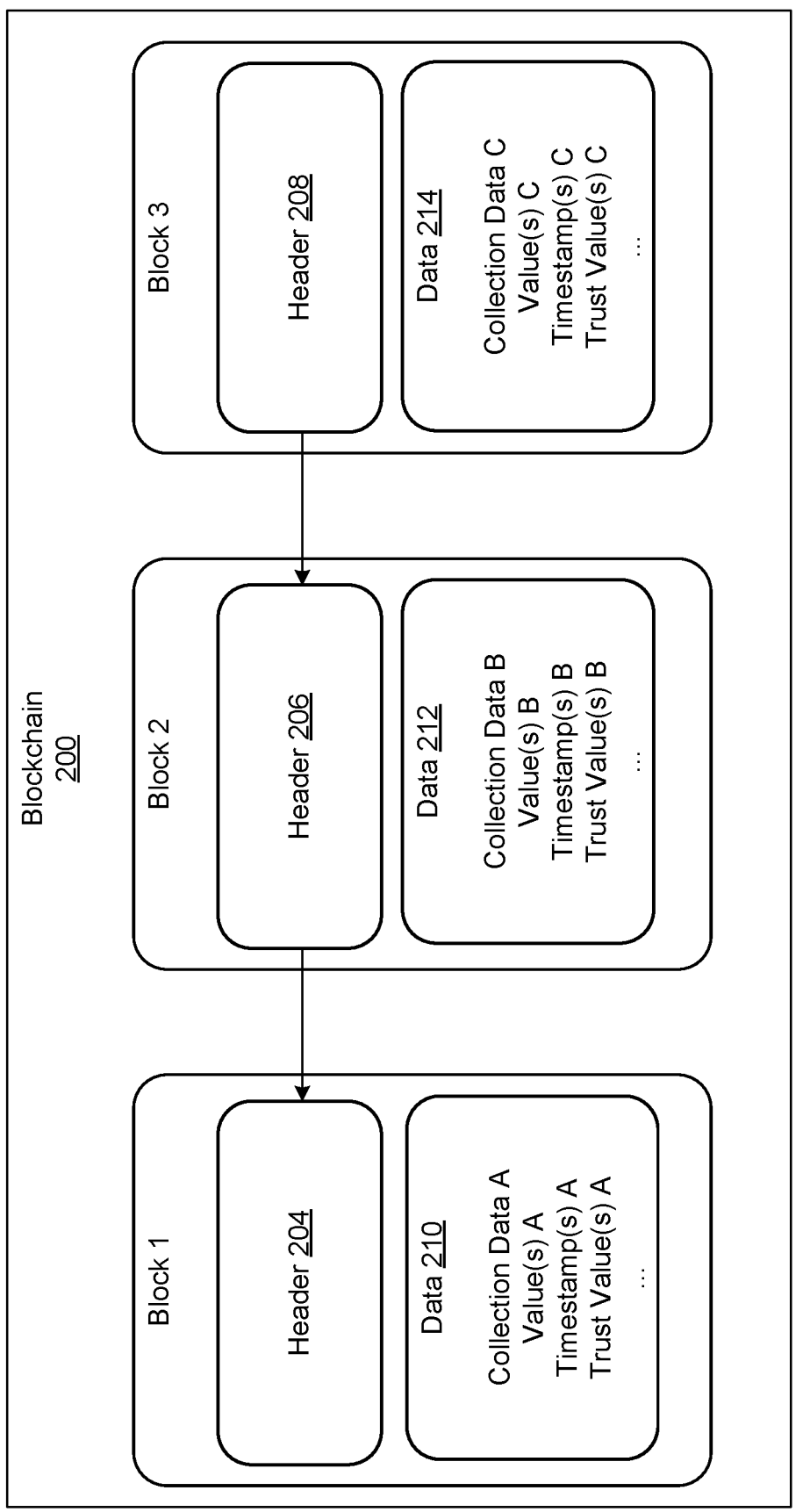
FIG. 2 depicts an example of a portion of a blockchain according to some embodiments.

FIG. 2 depicts an example of a portion of a blockchain 200 according to some embodiments. The blockchain 200 may be an example of the data store 112 of FIG. 1. The portion of a blockchain 200, may include a number of blocks (as depicted at least block 1, 2, and 3) each block including respective headers 204, 206, and 208. Each header may include data elements including version numbers, previous block hashes, merkle roots, and timestamps. Each block may also include data 210, 212, and 214, respectively.

For example, data 210 may include collection data A (e.g., device data of the data collecting device and/or data indicating the data was collected by a human). Collection data A may include any suitable combination of a serial number, a network address, a device name, a device type or any suitable information associated with a device (e.g., a sensor of the shipping container 104 of FIG. 1). If value(s) A were collected by a human, collection data A may include an indicator that indicates collection was performed by a human and/or an identifier identifying the particular human that collected the value(s) A. The data 210 may further include value(s) A. Value(s) A may include any suitable number of measurements and/or attributes corresponding provided by the device and/or the human indicated by collection data A. One or more timestamps may be included in data 210. Each timestamp may correspond to a particular value of value(s) A. Similarly, there may be one or more trust values included in data 210. Each trust value may correspond to a particular value of value(s) A indicating a degree of accuracy and/or trustworthiness of the corresponding value.

Any suitable number of blocks may be included in the blockchain 200, each block corresponding to a device and/or human by which the corresponding collection data has been provided. As depicted, Block 2 may include data 212 which may correspond to the same or different shipping container and/or item. Thus, the blockchain 200 may be utilized to maintain records of various shipping containers and/or corresponding items over a variety of transit periods. Each block may include a hash of the previous block. A shipping container and/or a service provider (e.g., a shipping provider) and/or smart contract may utilize the blockchain 200 to obtain measurements and/or attributes with which the state of an item during transmit may be verified (e.g., determined to be within acceptable parameters or outside acceptable parameters at a given time and/or over a given period of time, during transit, and the like). Utilizing blockchain 200 to store this information ensures that the measurements and attributes collected over time cannot be tampered with or altered.

Returning to FIG. 1, the sensor data obtained at T1 and transmitted to the data store 112 may include the measurements and/or attributes obtained by the sensor, device data associated with the sensor (e.g., serial numbers, device type, sensitivity rating of the sensor, or any suitable data identifying the type and/or accuracy of the sensor), a timestamp indicating the time T1, a trust value (whether assigned according to a predetermined protocol or as determined by a machine-learning model), or any suitable data related to obtaining the sensor data. In some embodiments, any suitable number of sensors of the shipping container 104 may be utilized at time T1 to obtain any suitable number of measurements and/or attributes of the shipping container 104 and/or the item housed by the shipping container 104. This data may be combined before transmission and/or at least one instance of sensor data may be separately transmitted to the data store 112. In some embodiments, the data store 112 may be configured to sensor data obtained at T1 (or during a predetermined time period encompassing T1) in the same record or in separate records.

At time T2, the shipping container 104 may reach another stop along the path to destination location 110. Upon determining the shipping container 104 has stopped (or based at least in part on user input, according to a predetermined schedule and/or frequency, etc.), the sensors of the shipping container 104 may be configured to obtain additional sensor data. The additional sensor data may be transmitted to the data store 112 to be stored in one or more records different from the one or more records used to store the sensor data obtained at T1. In some embodiments, agent 114 (e.g., a warehouse worker) may intervene to aid the one or more sensors of shipping container 104 collect sensor data and/or the agent 114 may provide user input indicating one or more measurements and/or attributes of the shipping container 104 and/or the item housed by shipping container 104. For example, the agent 114 may provide user input (e.g., via an interface and/or input device of the shipping container 104 such as a touch pad, via a user device 116 operated by the agent 114, or any suitable device) indicating one or more measurements and/or attributes of the shipping container 104 and/or item within the shipping container 104. The shipping container 104 may be configured to assign a trust value to the user input provided by the agent 114 before transmitting any suitable combination of the user input (and/or data derived from the user input), the assigned trust value, and data indicating that the data was provided by a user (or a particular user), and/or data identifying the device utilized by the user to provide the user input, to the data store 112. This data may collectively be referred to as "user-assisted data."

At time T3, the shipping container 104 and/or sensors of the shipping container 104 may be configured to obtain additional data (e.g., additional sensor data, additional user-assisted data, etc.) and/or the agent 118 (e.g., a postal worker) may provide additional user input via the shipping container 104 and/or a user device operated by the agent 118. The additional data may be collected in a similar manner as discussed above with respect to sensor data and/or user-assisted data.

It should be appreciated that the shipping container 104 and/or the sensors of shipping container 104 may be stimulated to obtain sensor data and/or user input according to any suitable predetermined data procurement protocol. By way of example, a predetermined data procurement protocol may specify that sensor data and/or user input is to be obtained according to a predetermined frequency, a predetermined schedule, in accordance with a predetermined set of conditions (e.g., determining that the shipping container 104 was in motion but has stopped motion for over a threshold period of time, upon receiving data from another device such as the user device 116 indicating that sensor data and/or user input is to be obtained, etc.), or the like. In some embodiments, the predetermined data procurement protocol for obtaining sensor data and/or user input may be the same or different depending on the item(s) being shipped and/or the particular shipping container being utilized. In some embodiments, the shipping container 104 and shipping container 106 may contain differing sets of sensors and/or input devices and, thus, may operate according to different predetermined data procurement protocols.

At any suitable time, the shipment data (e.g., sensor data and/or user input corresponding to the shipment of shipping container 104) stored in data store 112 may be accessed by any suitable computing device (e.g., by the shipping container 104, a user device, a server computer, etc.). The shipment data may be analyzed (e.g., by a computing device, by the smart contract stored in data store 112, etc.) to determine a state of the item during transit (e.g., to determine a whether the item was mismanaged). The determination of mismanagement may differ depending on the item. By way of example, a determination may be found when the item is perishable and shipment data indicates the item was stored in an unacceptable predefined temperate range exceeding a predetermined period of time, the shipping container malfunctioned allowing the temperature to exceed a predefined threshold value, the item was dropped with a force that exceeded a predefined force threshold, etc. Conversely, a determination that the item was managed properly may be found when the sensor data and/or user input indicates measurements and/or attributes of the shipping container and/or item that fall in an acceptable predefined range and/or equal acceptable values based on a predefined set of conditions associated with the item. In some embodiments, the determination that the item was mismanaged may identify a particular outcome likely stemming from the mismanagement (e.g., damage, spoilage, theft, etc.) and a likelihood that the determination of mismanagement is accurate (e.g., 95% confidence score). A determination that the item was managed properly may also include a likelihood value that the determination is accurate.

In some embodiments, the determination (e.g., mismanaged and/or managed properly) and the likelihood of its accuracy may be calculated based on the shipment data and corresponding trust values associated with the instances of sensor data and/or user input. In some embodiments, the trust values of autonomously provided sensor data (e.g., sensor data that was collected independent of user intervention/interaction) may be higher than sensor data and/or user input provided, at least in part, based on user action. Accordingly, a likelihood that the outcome is accurate may be higher when the shipment includes a higher usage of autonomous devices (e.g., sensors of the shipping container 104) than user input. At any suitable time, the user 102 (and/or the provider of the shipping container 104 and/or item, the shipping entity, etc.) may be allowed access to view the shipment data, outcome determination, and value indicating the likelihood the outcome determination is accurate. It should be appreciated that this data may be calculated and accessed at any suitable time during the transit period and/or after delivery (at least for a predetermined period of time or indefinitely). In some embodiments, a smart contract stored in data store 112 may be utilized to make these determinations and/or to calculate the likelihood of the accuracy of the determination. The smart contract may output indications of these determinations and/or likelihoods.

In a similar manner, another item may be shipped in shipping container 106. User input and/or sensor data may be provided at T4 and additional sensor data may be obtained at T5 and T6 using one or more sensors of the shipping container 106. Upon delivery, or at any suitable time, a determination may be made that the item was mismanaged and a likelihood value indicating the accuracy of that determination may be accessible to any suitable computing device. Thus, the user 102, the item supplier, the shipper, or any suitable party may access the shipment data and/or any data derived from the shipment data at any suitable time. As the shipment data may additionally, or alternatively, include location data, the user 102, the item supplier, the shipper, or any suitable party may ascertain the location of the shipping container 104 at any suitable time.

Figure 3:
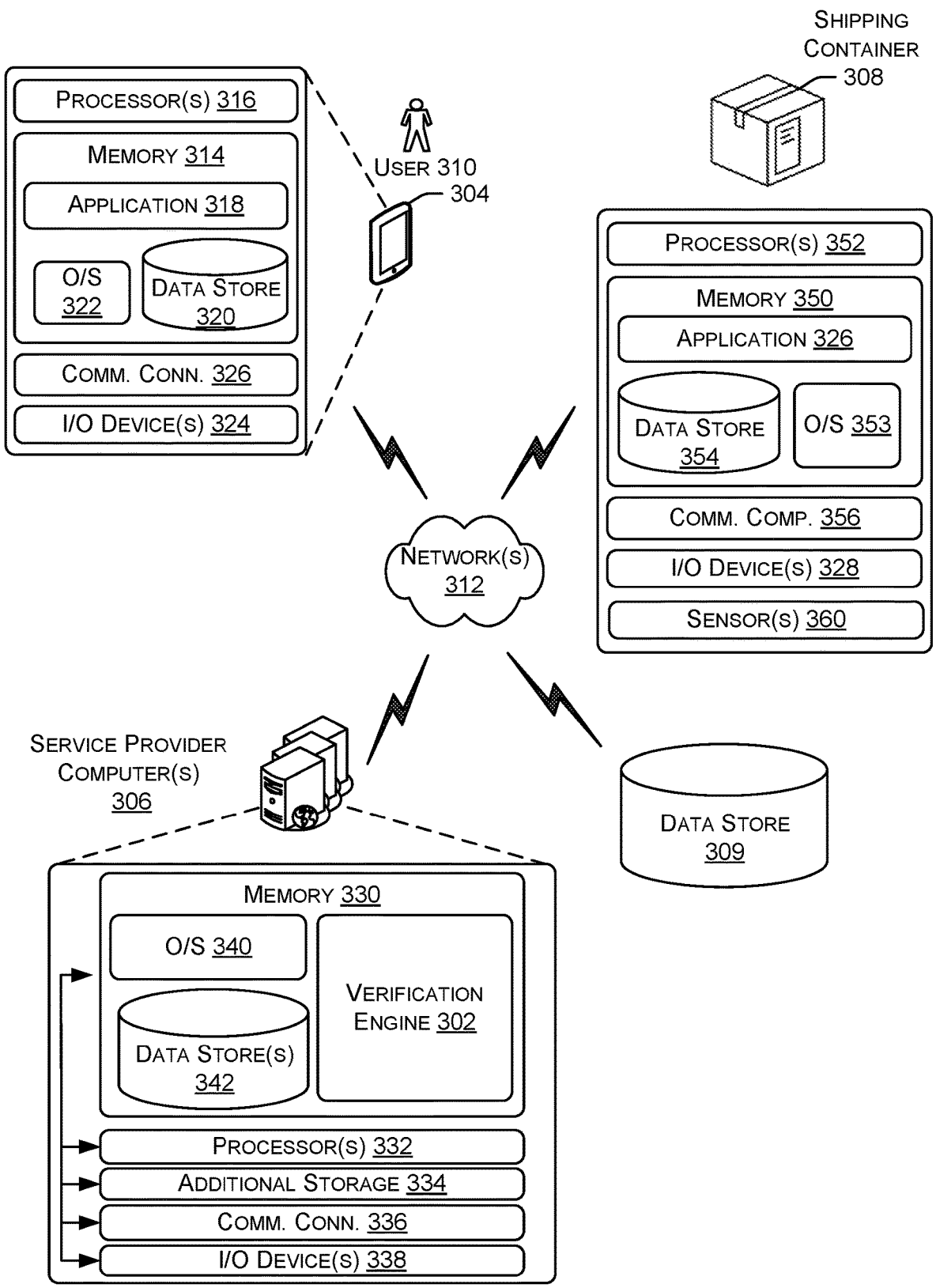
FIG. 3 is a block diagram illustrating example components of a delivery system, in accordance with at least one embodiment.
Figure 4:
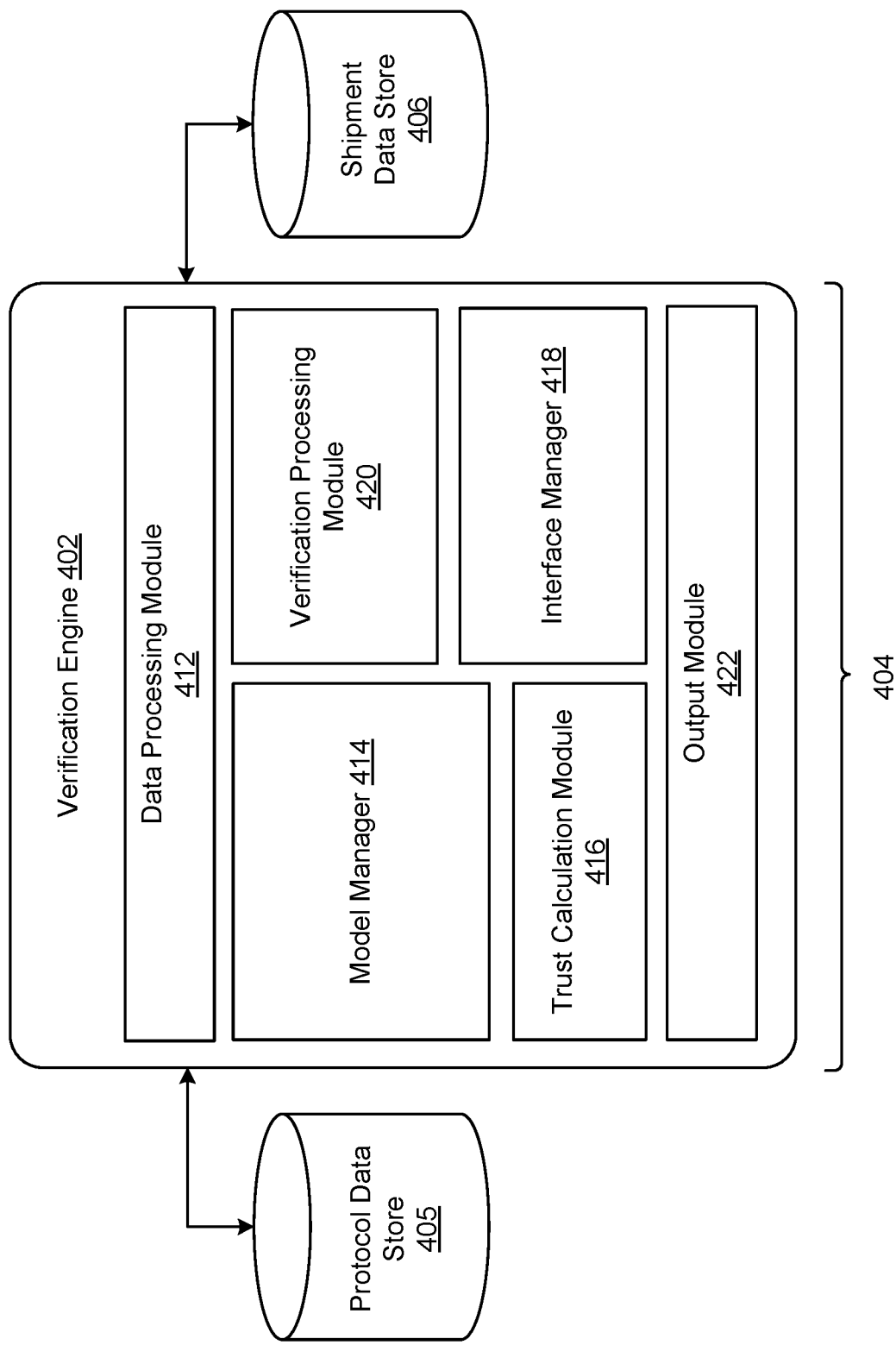
FIG. 4 is a schematic diagram illustrating an example computer architecture for a verification engine, including a plurality of modules that may perform functions in accordance with at least one embodiment.

FIGS. 3 and 4 are illustrations of systems and device components that can be used to implement the techniques provided herein for verifying a state of an item during transmit.

FIG. 3 is a block diagram illustrating example components of a delivery system 300, in accordance with at least one embodiment. The system 300 may include a verification engine 302 which may be configured to operate, in whole or in part, at the user device 304, the service provider computer(s) 306, and/or the shipping container 308 (e.g., an example of the shipping container 104 and/or 106 of FIG. 1). In system 300, one or more user(s) (e.g., user 310) may utilize a user device (e.g., a user device of a collection of user devices) to provide input via network(s) 312 to the service provider computer(s) 306. For example, the user 310 may access any suitable input/output devices (e.g., I/O device(s) 324 discussed below) such as a keyboard, a microphone, and the like, to provide input (e.g., via an application 318 running on the user device 304) to service provider computer(s) 306 via one or more network(s) 312. In some aspects, the application 318 (e.g., a web browser application, a shipping application) operating at the user device 304 may be hosted, managed, and/or provided by a computing service or service provider, such as by utilizing one or more service provider computer(s) 306.

In some embodiments, the network(s) 312 may include suitable network such as the Internet, wireless network, cellular networks, other private and/or public networks, or any suitable combination of the above.

In some embodiments, the verification engine 302, discussed further below in more detail, may operate in whole or in part on the user device 304, the service provider computer(s) 306, and/or the shipping container 308. Thus, in some embodiments, the user 310 (e.g., a procurer of the item contained in shipping container 308, a participant in the shipping process (e.g., a data collector), etc.) may access the functionality of the verification engine 302 directly through the user device 304 and/or the service provider computer(s) 306 via user interfaces provided by the verification engine 302. In some embodiments, the functionality of the verification engine 302 may be provided as a software service with which user input may be submitted and various interfaces and/or interface elements may be presented via the application 318 at the user device 304.

In some embodiments, the application 318 may allow the user(s) 310 to interact with the service provider computer(s) 306 and/or the data store 309 (e.g., an example of the data store 112 of FIG. 1). Data store 309 may be a centralized and/or distributed storage system. In some embodiments, the data store 309 may be an example of the blockchain 200 of FIG. 2. In some embodiments, the data store 309 may be local to and/or accessible by any suitable combination of the user device 304, the service provider computer(s) 306, and/or the shipping container 308. In some embodiments, the data store 309 may be maintained by a remote system and/or network such as a blockchain network (not depicted). The data store 309 may be configured to receive and store various measurements and/or attributes of the shipping container and/or the item contained by the shipping container 308 from the user device 304, the service provider computer(s) 306, and/or the shipping container 308.

The service provider computer(s) 306, perhaps arranged in a cluster of servers or as a server farm, may host the applications 318 and/or 326 operating on the user device 304 or the shipping container 308, respectively, and/or cloud-based software services. The applications 318 and 326 may be capable of handling requests from the user 310 and serving, in response, various user interfaces and/or output that can be presented at the user device 304 (e.g., via a display and/or speaker of I/O device(s) 324) or at the shipping container (e.g., via a display and/or speaker of the I/O device(s) 328). The applications 318 operating on the user device 304 and/or the application 326 operating at the shipping container can present any suitable type of website that supports user interaction such as providing any suitable measurement and/or attribute of the shipping container 308 and/or the item contained by the shipping container 308. The described techniques can similarly be implemented outside of the applications 318 and 326 such as with other applications running on the user device 304 and/or the shipping container 308.

The user device 304 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device 304 may be in communication with the service provider computer(s) 306 and/or the shipping container 308 via the network(s) 312, or via other network connections.

In one illustrative configuration, the user device 304 may include at least one memory 314 and one or more processing units (or processor(s)) 316). The memory 314 may store program instructions that are loadable and executable on the processor(s) 316, as well as data generated during the execution of these programs. The memory 314 may be volatile (such as random access memory (RAM)) and/or non-volatile (such as read-only memory (ROM), flash memory, etc.). In some implementations, the memory 314 may include multiple different types of memory, such as static random access memory (SRAM), dynamic random access memory (DRAM), or ROM. The memory 314 may include an operating system 322, one or more data stores 320, and one or more application programs, modules, or services for implementing the features of the verification engine 302 disclosed herein, provided via the application 318 (e.g., a browser application, a shipping application, a shopping application, etc.). The application 318 may be configured to receive, store, and/or display a network page or other interface for interacting with the service provider computer(s) 306.

The user device 304 may also contain communications connection(s) 336 that allow the user device 304 to communicate with data store 309, computing devices (e.g., service provider computer(s) 306, shipping container 308, or any suitable device on the network(s) 312. The user device 304 may also include I/O device(s) 324, such as a keyboard, a mouse, a pen, a voice input device (e.g., a microphone), a touch input device, a display, speakers, a printer, etc.

In some aspects, the service provider computer(s) 306 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. The service provider computer(s) 306 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 306 may include at least one memory 330 and one or more processing units (or processor(s)) 332. The processor(s) 332 may be implemented as appropriate in hardware, computer-executable instructions, firmware, or combinations thereof. The memory 330 may store program instructions that are loadable and executable on the processor(s) 332, as well as data generated during the execution of these programs. The memory 330 may be volatile (such as RAM) and/or non-volatile (such as ROM, flash memory, etc.). The service provider computer(s) 306 or servers may also include additional storage 334, which may include removable storage and/or non-removable storage. The additional storage 334 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 330 may include multiple different types of memory, such as SRAM, DRAM, or ROM.

The memory 330, the additional storage 334, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 330 and the additional storage 334 are all examples of computer storage media. Additional types of computer storage media that may be present in the service provider computer(s) 306 may include, but are not limited to, random access memory (RAM), phase-change RAM (PRAM), static RAM (SRAM), dynamic RAM (DRAM), read-only memory (ROM), electrically erasable programmable ROM (EEPROM), flash memory or other memory technology, compact disc ROM (CD-ROM), digital video disc (DVD) or other optical storage, magnetic cassettes, magnetic tape, magnetic disk storage or other magnetic storage devices, or any other medium which can be used to store the desired information and which can be accessed by the service provider computer(s) 306. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 306 may also contain communications connection(s) 336 that allow the service provider computer(s) 306 to communicate with the data store 309, the shipping container 308, the user device 304, or any suitable combination of the devices on network(s) 312. The service provider computer(s) 306 may also include I/O device(s) 338, such as a keyboard, a mouse, a pen, a voice input device, a touch input device, a display, speakers, a printer, etc.

Turning to the contents of the memory 330 in more detail, the memory 330 may include an operating system 340, one or more data stores 342, and/or one or more application programs, modules, or services for implementing the features disclosed herein, such as the features provided by the verification engine 302.

In one illustrative configuration, the shipping container 308 may include at least one memory 350 and one or more processing units (or processor(s)) 352. The memory 350 may store program instructions that are loadable and executable on the processor(s) 352, as well as data generated during the execution of these programs. The memory 350 may be volatile (such as random access memory (RAM)) and/or non-volatile (such as read-only memory (ROM), flash memory, etc.). In some implementations, the memory 350 may include multiple different types of memory, such as static random access memory (SRAM), dynamic random access memory (DRAM), or ROM. The memory 314 may include an operating system 353, one or more data stores 354, and one or more application programs, modules, or services for implementing the features of the verification engine 302 disclosed herein, provided via the application 326 (e.g., a browser application, a shipping application, a shopping application, etc.). The application 318 may be configured to receive, store, and/or display a network page or other interface for interacting with the service provider computer(s) 306.

The memory 350, both removable and non-removable, may be an example of computer-readable storage media. For example, computer-readable storage media may include volatile or non-volatile, removable or non-removable media implemented in any method or technology for storage of information such as computer-readable instructions, data structures, program modules, or other data. The memory 350 may be an example of computer storage media. Additional types of computer storage media that may be present in the shipping container 308 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the shipping container 308. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Shipping container 308 may include communication component(s) 356 (e.g., wireless transceiver(s)) for transmitting and receiving data via various means, protocols and standards, such as via Society of Automotive Engineers (SAE) or European Telecommunications Standards Institute (ETSI) cellular vehicle-to-everything (CV2X) messages and data elements or other wireless and wireless protocols. In some embodiments, the communication component(s) 356 may be configured to transmit and receive data messages and elements via a short-range wireless communications protocol (e.g., Bluetooth®, Bluetooth Low Energy®, etc.), and/or via a local and/or wide area network, and/or via a cellular network, and/or via any suitable wireless network. Of course, it should be understood that these are merely examples of networks that may be utilized by the shipping container 308 over a wireless link, and claimed subject matter is not limited in this respect. In an embodiment, communication component(s) 356 may comprise various combinations of wide area network (WAN), wireless local area network (WLAN), and/or personal area network (PAN) transceivers. In an embodiment, communication component(s) 356 may also comprise a Bluetooth transceiver, a ZigBee transceiver, or other PAN transceiver. Communication connection(s) 356 may allow the shipping container 308 to communicate with the data store 309, the service provider computer(s) 306, the user device 304, or any suitable combination of the devices on network 312.

The shipping container 308 may also include I/O device(s) 328, such as a keyboard, a mouse, a pen, a voice input device, a touch input device, a display, speakers, a printer, etc., with which user input may be obtained and/or data may be provided (e.g., visual, audibly, electronically, etc.).

Turning to the contents of the memory 350 in more detail, the memory 350 may include an operating system 353, one or more data stores 354, and/or one or more application programs, modules, or services for implementing the features disclosed herein, such as the features provided by the verification engine 302.

In some embodiments, the shipping container 308 may include any suitable number of sensors (e.g., sensor(s) 360). Sensor(s) 360 may include a Global Navigation Satellite System (GNSS) receiver. The GNSS receiver may be configured to receive and digitally process signals from a navigation satellite (and/or other vehicles) in order to provide position, velocity, and time of the receiver. The GNSS receiver may include hardware and/or software components. In an embodiment, GNSS signals from GNSS Satellites received by the GNSS receiver may be utilized by the shipping container 308 (or another computing device such as the user device 304 and/or the service provider computer(s) 306) for location determination of the shipping container 308 and/or for the determination of GNSS signal parameters and demodulated data. In an embodiment, signals received by the communication component(s) 356 may be used for location determination, alone or in combination with GNSS signals received by the GNSS receiver.

Examples of network technologies that may support wireless transceiver(s) of the communication component(s) 356 may include Global System for Mobile Communications (GSM), Code Division Multiple Access (CDMA), Wideband Code Division Multiple Access (WCDMA), Long Term Evolution (LTE), 5G or New Radio Access Technology (NR), High Rate Packet Data (HRPD), and the like. GSM, WCDMA and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by a Home Node B (HNB).

In some embodiments, location of the shipping container 308 may be derived based at least in part on an observed time difference of arrival (OTDOA) (e.g., within a LTE network) or an angle-of-arrival/angle-of-departure (AOA/AOD) value (e.g., of a Bluetooth network.

In an embodiment, sensor(s) 360 may include one or more cameras. In an embodiment, the camera(s) may comprise a camera sensor and mounting assembly. Different mounting assemblies may be used for different cameras of the shipping container 308. In some embodiments, one or more cameras may be inward facing to capture images of the interior of the shipping container 308 and/or one or more cameras may be outward facing to capture images of environment in which the shipping container 308 is located. The cameras may similarly be used to verify and calibrate the other systems to verify that distance measurements are correct. Similarly, when combined with, for example, one or more accelerometer(s), impact time and/or force measurements may be estimated and/or verified. In some embodiments, the cameras may be utilized, alone or in concert, to determine an orientation of the shipping container 308.

Any suitable number of accelerometers, gyros, inertial measurement units, and/or magnetometers may be included in sensor(s) 360. In an embodiments, these devices may be utilized to provide and/or verify motion, directional information, a maximum shock value, a number of times the shipping container 308 experienced a force exceeding a threshold value (e.g., a shock trigger count), and the like. Accelerometers and gyros may be utilized to monitor amplitude and frequency of oscillations of the of the shipping container 308. By way of example, an accelerometer (e.g., a 3-axis accelerometer) can measure vibrations of the shipping container 308 such as movement or mechanical oscillation about an equilibrium position of the shipping container 308. Accelerometers, in an embodiment, may also be utilized to verify actual time of impact and/or force of impact of collisions between the shipping container 308 and a surface and/or object. Gyros and magnetometers may, in an embodiment, be utilized to measure rotational status (e.g., tilt, orientation) of the shipping container 308. In some embodiments, any suitable combination of accelerometers and/or gyroscopes may be utilized, alone or in concert, to determine an orientation of the shipping container 308. One or more piezoelectric sensors may be used to detect strain, stress and/or other forces applied to one or more portions of the shipping container 308. Such strain sensors may be used to measure and monitor an amount of physical force that is being applied or has been applied, which may be indicative of dents, caused by mishandling or drops for example, or other types of actual or potential damage that could compromise the integrity of the shipping condition. Another item or container above the shipping container 308 may be crushing the shipping container 308, for instance.

In some embodiments, the sensor(s) 360 may include one or more light sensors such as such as time of flight sensors, photodiodes, photo-resistors, photo transistors, or the like. The light sensors may be configured to measure an amount of light (or type of light) in a given environment. In some embodiments, the light sensors may use light to identify whether the shipping container 308 has been opened. By way of example, a transmitter may be placed in the shipping container 308 and a receiver may be placed on the lid of the shipping container 308 so as to receive the light emitted by the transmitter. Should the lid be removed and/or manipulated, the receiver (or the processor(s) 352) may be configured to determine the shipping container has been opened. In some embodiments, the light sensors may be utilized to identify that the item(s) within the shipping container 308 have been exposed to a particular type of light (e.g., ultraviolet, infrared, etc.).

In some embodiments, the sensor(s) 360 may include one or more temperature sensors configured to measure the temperature within the shipping container 308 (interior temperature) and/or the ambient temperature outside the shipping container (exterior temperature). In some embodiments, the temperature sensor(s) and/or the processor(s) 352 may be configured to identify when the interior and/or exterior temperature exceed or is below a predetermined threshold value.

In some embodiments, the sensor(s) 360 may include one or more humidity sensors configured to measure the humidity within the shipping container 308 (interior humidity) and/or the humidity outside the shipping container (exterior humidity). Certain levels of humidity detected in the interior may indicate or imply leakage of liquid or gas within the shipping container 308, or damage (e.g., crack, puncture) to the container that reduces the amount of seal around the shipping container 308. In some embodiments, the humidity sensor(s) and/or the processor(s) 352 may be configured to identify when the interior and/or exterior humidity exceeds or is below a predetermined threshold value.

In some embodiments, the temperature sensor(s), the humidity sensor(s) and/or the processor(s) 352 may be configured to identify when the interior and/or exterior temperature and/or humidity exceeds or is below a dynamically determined threshold value. The shipping container 308 may contain items that are more or less sensitive to temperature or humidity than others. For instance, some materials may be sensitive to heat or heightened humidity. Organic materials may also be sensitive to prolonged exposure heat or humidity. Some shipping containers may be empty, e.g., before or after transport of contents, and may no longer require monitoring of temperature or humidity based on a preset temperature threshold. Hence, acceptable interior and/or exterior temperature and/or humidity values or ranges may change depending on the contents, transport conditions or requirements, and even climate conditions as the weather experiences a sharp change or as the shipping container 308 is transported to different locations (e.g., warehouses, vehicles, outside locations at varying temperatures).

In some embodiments, the temperature sensor(s), the humidity sensor(s) and/or the processor(s) 352 may be configured to identify when the interior and/or exterior temperature and/or humidity exceeds or is below more than one predetermined or dynamically determined threshold value (first threshold, second threshold, third threshold, and so on as applicable) to account for various levels of acceptability of the interior and/or exterior temperature and/or humidity. For example, a temperature value that exceeds a first threshold (e.g., 25 C) but not a second threshold (e.g., 30 C) may be flagged as a warning condition that does not require intervention, but a temperature value that exceeds the second threshold may be considered to be a condition where intervention is recommended, e.g., via an alert to a user (e.g., via the user device 304 or a portion of a warehouse that provides an indication (e.g., visual, audio) to the user) to ensure integrity of the contents of the shipping container 308, or via a control signal to the shipping container 308 or to at least a location of the warehouse which modifies a setting of any cooling or heating systems installed in the shipping container 308 or the warehouse location. Similar procedures may be implemented for monitoring humidity and light levels and measurements by other ones of the sensor(s) 360.

In some embodiments, the second (or any number beyond) threshold may be set in the opposite direction of the first threshold. For instance, many materials stay stable in a specific range of temperatures (e.g., medicine, food). Hence, first and second thresholds may be set to at least a minimum temperature value and a maximum acceptable temperature value. More than two thresholds may be used as well. For example, three threshold values may be determined for a frozen food item: −10 C, 2 C and 5 C. In this case, although it may be desirable for a perishable item to stay frozen for preservation purposes during transit, it may not be so desirable to be in a temperature that is too low, as that may cause cold damage, e.g., from frost. It may also not be desirable for some materials to thaw or go through multiple freeze-thaw cycles. A temperature sensor may be configured to detect interior and/or exterior temperatures or changes thereto that are or that cross any of the above three threshold values. Similar thresholds may be identified and set statically or dynamically for any other type of sensor discussed herein.

In some embodiments, any suitable number of the sensor(s) 360 may be configured with a machine-learning model that may take sensor measurements as input and provide output (e.g., a determination derived from sensor readings such as the shipping container 308 was opened, dropped, exposed to light, or the like, and a corresponding confidence value that indicates the confidence associated with the determination as determined by the model based on data learned from historical sensor data examples).

FIG. 4 is a schematic diagram illustrating an example computer architecture 400 for verification engine 402 (e.g., an example of the verification engine 302 of FIG. 3), including a plurality of modules 404 that may perform functions in accordance with at least one embodiment. The modules 404 may be software modules, hardware modules, or a combination thereof. If the modules 404 are software modules, the modules 404 can be embodied on a computer readable medium and processed by a processor in any of the computer systems described herein. It should be noted that any module or data store described herein, may be, in some embodiments, be a service responsible for managing data of the type required to make corresponding calculations. The modules 404, or some portion of the modules 404, may be operated at the user device 304, the shipping container 308, and/or the service provider computer(s) 306 of FIG. 3, or any suitable combination of the above.

In the embodiment shown in the FIG. 4, protocol data store 405 (e.g., a data store configured to store various protocols such as data procurement protocols, validation protocols, and the like) and shipment data store 406 (e.g., an example of data stores 112 and 309 of FIGS. 1 and 3, respectively) are shown, although data can be maintained, derived, or otherwise accessed from various data stores, either remote or local to the verification engine 402, to achieve the functions described herein. In at least one embodiment, the data stores 405 and 406 described herein may be physically located on the user device 304, the shipping container 308, the service provider computer(s) 306, and/or the data store 309 of FIG. 3. The verification engine 402, as shown in FIG. 4, includes various modules such as a data processing module 412, model manager 414, trust calculation module 416, interface manager 418, verification processing module 420, and an output module 422. Some functions of the modules 404 are described below. However, for the benefit of the reader, a brief, non-limiting description of each of the modules is provided in the following paragraphs.

In at least one embodiment, the verification engine 402 includes the data processing module 412. Generally, the data processing module 412 may be utilized to receive or transmit any suitable data with respect to any example provided herein. By way of example, the data processing module 412 may be configured to receive any suitable combination of data such as sensor data, data procurement protocol(s), trust value assignment protocols, user input, and the like. In some embodiments, the data processing module 412 may be configured to store protocols (e.g., data procurement protocol(s), trust value assignment protocol(s) identifying calculation for assigning trust values, verification protocol(s) identifying operations to perform to verify the state of an item during transit, etc.) in protocol data store 405, a data store configured to store such information. Data processing module 412 may be configured to store sensor data and/or user input (or any suitable shipment data) in shipment data store 406. In some embodiments, data processing module 412 may be configured to stimulate or otherwise obtain sensor data from the sensor(s) 360 of FIG. 3 according to one or more data procurement protocol(s) stored in protocol data store 405. The particular data procurement protocol(s) utilized may be determined based at least in part on the item and/or items being shipped.

The verification engine 402 may include model manager 414. Model manager 414 may be configured to store one or more machine-learning models. In some embodiments, model manager 414 may execute, at least in part, on any suitable number of the sensor(s) 360. The model manager 414 may include code that, when executed by at least one processor, e.g., processor(s) 332, 316 and/or 352, performs any suitable operation associated with providing a machine-learning model input and obtaining output from the same.

The verification engine 402 may include trust calculation module 416. Trust calculation module 416 may include code that, when executed by at least one processor, causes a trust value to be calculated and assigned to an instance of sensor data, user input, and/or data derived from user input. In some embodiments, the trust calculation module may be configured to cause trust values to be calculated according to a trust value assignment protocol stored in the protocol data store 405. In some embodiments, the trust calculation module 416 may be configured to cause the calculated trust value(s) to be stored with sensor data and/or user input data to which the trust value(s) correspond within shipment data store 406. By way of example, the trust value(s) may be provided to the output module 422 and transmitted (e.g., via communication component(s) 356) to the shipment data store 406 for storage.

Verification engine 402 may include interface manager 418. Interface manager 418 may be configured to provide any suitable user interface (e.g., graphical and/or audible) provided at a computing device (e.g., at the user device 304, the shipping container 308, the service provider computer(s) 306). The interface manager 418 may be configured to receive input from those interfaces and provide such input to any suitable combination of the other modules of modules 404 for further processing.

Verification engine 402 may include verification processing module 420. Verification processing module 420 may be configured to obtain and analyze the shipment data from shipment data store 406. This analysis may occur according to a predetermined verification protocol stored in the protocol data store 405 and/or the analysis may be performed upon request (e.g., a user request received from user device 304 and/or service provider computer(s) 306). In some embodiments, the verification engine 402 may be configured with code that, when executed by at least one processor, performs any suitable operations described herein related to determining whether an item (or items) were mismanaged or managed properly (e.g., managed within predefined acceptable threshold). If an item is determined to have been mishandled, the verification processing module 420 may include code that, when executed by at least one processor, causes any suitable operation to be performed for calculating a likelihood that the determination is accurate and/or a likely outcome (e.g., damage, spoilage, etc.) based at least in part on the shipment data obtained from the shipment data store 406. In some embodiments, the calculations performed may be specified in a predetermined verification protocol. In some embodiments, the verification processing module may include a machine-learning model trained from historical sensor data/user input examples to identify a determination of whether the item was mismanaged and/or managed properly. By way of example, the machine-learning model may be trained with a training data set including any suitable combination of sensor data and/or user input for which mismanaged/managed properly determinations are already known. In some embodiments, subsequent sensor data and/or user input may be provided to this model to receive output including 1) a determination as to the state of an item during transit (e.g., whether the item was mismanaged or managed properly), 2) a likely outcome (e.g., an indication as to a likely current state of the item such as damaged, spoiled, etc.) and/or a one or more confidence values indicating the confidence in the values provided for the state of the item during transit and/or the item's current state.

Verification engine 402 may include output module 422. Output module 422 may be configured with code that, when executed by at least one processor, causes data to be transmitted to a remote computing device (e.g., the user device 304, the service provider computer(s) 306, the shipping container 308, the data store 309 and/or one or more computing devices that manage data store 309).

Figure 5:
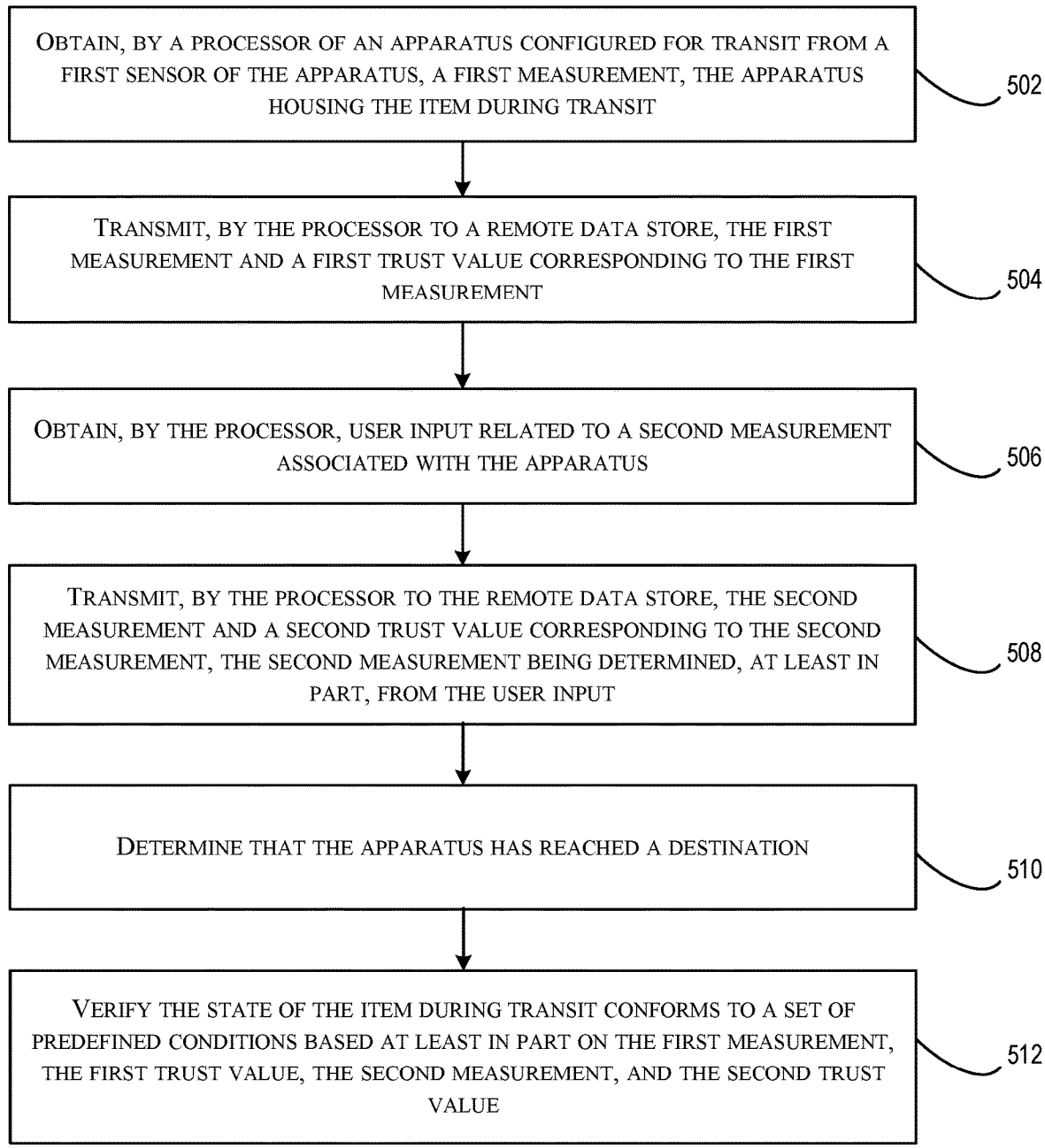
FIG. 5 is a flow diagram of a method for verifying the state of an item during transit, according to an embodiment.

FIG. 5 is a flow diagram of a method 500 for verifying the state of an item during transit, according to an embodiment. A computer-readable medium may store computer-executable instructions that, when executed by at least one processor, cause at least one computer to perform instructions comprising the operations of the method 500. It should be appreciated that the operations of the method 500 may be performed in any suitable, not necessarily the order depicted in FIG. 5. Further, the method 500 may include additional, or fewer operations than those depicted in FIG. 5. The operations of method 500 may be performed by a computing system (e.g., the shipping container 104 of FIG. 1) comprising the verification engine 302 of FIG. 3 which may operate in whole or in part on a shipping container (e.g., shipping container 308 of FIG. 3) and/or at a service provider computer (e.g., the service provider computer(s) 306 of FIG. 3) and/or at a user device (e.g., the user device 304 of FIG. 3).

The method 500 may begin at 502, where a first measurement may be obtained (e.g., by executing code associated with the data processing module 412 of FIG. 4) by a processor (e.g., processor(s) 352, a processor of the sensor(s) 360, etc. of FIG. 3)) of an apparatus configured for transit. In some embodiments, the apparatus configured for transit comprises a shipping container (e.g., shipping container 308 of FIG. 3). The shipping container may house an item during transit (e.g., for a duration of a transit period from shipping order initiation to item delivery). In some embodiments, the first measurement may include sensor data obtained by any suitable combination of sensor(s) 360 of FIG. 4 and/or the first measurement may include data derived from sensor data (e.g., output provided by a machine-learning model based on sensor data and/or user input as model input(s)).

At 504, the processor may transmit (e.g., by executing code of the output module 422) to a remote data store, the first measurement and a first trust value corresponding to the first measurement. The first trust value may be assigned by the processor(s) 352 and/or the processor of the collecting sensor (e.g., by executing code associated with the trust calculation module 416 of FIG. 4) based at least in part on a predefined protocol for assigning a trust value. In some embodiments, the first trust value may correspond to a confidence value calculated by a machine-learning model as part of output provided by the model in response to receiving sensor data as model input(s). In some embodiments, the remote data store may be an example of the data stores 112 and/or 309 of FIGS. 1 and 3, respectively. In some embodiments, the functionality of the machine-learning model may be provided by executing code associated with the model manager 414 of FIG. 4.

At 506, user input related to a second measurement associated with the apparatus (e.g., shipping container) may be obtained (e.g., by executing code associated with the data processing module 412). The user input may include any suitable user-assisted data including data directly provided by the user (e.g., at an interface provided by the shipping container 308 and/or the user device 304 of FIG. 3) and/or data derived (e.g., by the sensor(s) 360 and/or processor(s) 352) from the data directly provided by the user.

At 508, the processor (e.g., the processor(s) 352) may transmit (e.g., via communication component(s) 356 and by executing code of the output module 422) to the remote data store, the second measurement and a second trust value corresponding to the second measurement. In some embodiments, the second measurement may be determined, at least in part, from the user input. In some embodiments, the second trust value may be assigned based at least in part on a predefined protocol for assigning a trust value. In some embodiments, the second trust value may be less than the first trust value due, at least in part, to the involvement of user input.

At 510, it may be determined (e.g., by the processor(s) 352, by the sensor(s) 360 and by executing code associated with the data processing module 412) that the apparatus (e.g., shipping container) has reached a destination (e.g., a shipping destination). In some embodiments, this determination may be based at least in part on sensor data obtained by the sensor(s) 360.

At 512, code of the verification processing module 420 of FIG. 4 may be executed to determine whether the state of the item during transit conforms to a set of predefined conditions. For example, the item within the shipping container may be light sensitive and the indication that the shipping container was opened and/or the item was subjected to light may indicate an unacceptable condition (a condition that is outside a set of predefined conditions associated with the item. In some embodiments, this determination may be based at least in part on the first measurement, the first trust value, the second measurement, and the second trust value. In some embodiments, the first and second trust values may provide a composite confidence level corresponding to the determination (e.g., an unweighted or weighted average of the confidence values corresponding to the trust values, or other suitable product of the trust values).

If verification of the state of the item provides a positive result (e.g., the state of the item meets or exceeds the set of predefined conditions and any threshold(s) associated therewith) with a sufficient accuracy confidence score (e.g., above 95%), then the item may proceed with additional processing of the item (e.g., a signal that the item has met the predefined conditions is transmitted to a service provider computer 306, passed to local carrier, delivered to a user, or delivered to a destination). If the verification returns a negative result (e.g., the state of the item does not meet the set of predefined conditions or any thresholds associated therewith) with a sufficient accuracy confidence score (e.g., 95%), then the item may require intervention by manual inspection, computer-aided visual inspection (e.g., heat map, checking for certain visual features), etc.

If the verification cannot determine that the state of the item conformed to the set of predefined conditions, e.g., the confidence score did not reach one or more thresholds (e.g., below thresholds of 85% and/or 95%), a third (or more) measurement associated with the shipping container may be obtained, and a third (or more) trust value corresponding to the third measurement may be transmitted. Such additional measurements may increase the confidence score and result in a positive or negative determination. In some embodiments, if a determination cannot be made with sufficient confidence after a threshold number of additional measurements, other types of measurements may be obtained. These other types of measurements may include those based on any other sensor(s) not yet used to take measurements, multiple or longer measurements by the previously used sensor(s), repeat of measurements by the previously used sensor(s), etc. In some embodiments, if a determination cannot be made with sufficient confidence after a threshold number of additional measurements (or even with the two measurements obtained from 502 and 506), it may automatically be considered a negative result, leading to a recommendation for manual or computer-aided inspection and verification.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1: A method for verifying a state of an item during transit, comprising: obtaining, by a processor of an apparatus configured for transit from a first sensor of the apparatus, a first measurement, the apparatus housing the item during transit; transmitting, by the processor to a remote data store, the first measurement and a first trust value corresponding to the first measurement; obtaining, by the processor, user input related to a second measurement associated with the apparatus; transmitting, by the processor to the remote data store, the second measurement and a second trust value corresponding to the second measurement, the second measurement being determined, at least in part, from the user input; determining that the apparatus has reached a destination; and verifying the state of the item during transit conforms to a set of predefined conditions based at least in part on the first measurement, the first trust value, the second measurement, and the second trust value.

Clause 2: The method of clause 1, wherein the apparatus comprises a shipping container.

Clause 3: The method of any of clauses 1-2 wherein the shipping container comprises one of a box, a conveyance, a custom container, a receptacle, a smart container, or a tote.

Clause 4: The method of any of clauses 1-3 wherein the first sensor executes a machine-learning model locally, and wherein the first trust value is a confidence value provided by the machine-learning model.

Clause 5: The method of any of clauses 1-4 wherein the first sensor is one of one or more sensors of the apparatus, and wherein the one or more sensors comprise: an accelerometer; a gyroscope; an inertial measurement unit; a humidity sensor; a temperature sensor; a light sensor; a strain sensor; or any combination thereof.

Clause 6: The method of any of clauses 1-5 wherein the second trust value is less than the first trust value based at least in part on the second measurement being determined, at least in part, from the user input.

Clause 7: The method of any of clauses 1-6 wherein the second trust value quantifies a degree of user involvement in obtaining the second measurement.

Clause 8: The method of any of clauses 1-7 further comprising retrieving, from the remote data store, the first measurement, the first trust value, the second measurement, and the second trust value from the remote data store, wherein the state of the item during transit is verified by the processor of the apparatus.

Clause 9: The method of any of clauses 1-8 wherein the remote data store is a distributed public database, and wherein verifying the state of the item during transit comprises obtaining an output from a smart contract.

Clause 10: The method of any of clauses 1-9 wherein the state of the item during transit is verified based at least in part on comparing the first measurement and the second measurement to a set of predefined criteria associated with the item.

Clause 11: An apparatus configured for transit, the apparatus comprising: one or more sensors comprising at least a first sensor; a memory storing executable instructions for verifying a state of an item during transit; and one or more processors communicatively coupled with the memory, the one or more processors being configured to: obtain, from a first sensor of the apparatus, a first measurement, the apparatus housing the item during transit; transmit, to a remote data store, the first measurement and a first trust value corresponding to the first measurement; obtain user input related to a second measurement associated with the apparatus; transmit, to the remote data store, the second measurement and a second trust value corresponding to the second measurement, the second measurement being determined, at least in part, from the user input; determine that the apparatus has reached a destination; and verify the state of the item during transit conforms to a set of predefined conditions based at least in part on the first measurement, the first trust value, the second measurement, and the second trust value.

Clause 12: The apparatus of clause 11, wherein the apparatus comprises a shipping container.

Clause 13: The apparatus of any of clauses 11-12 wherein the shipping container comprises one of a box, a conveyance, a custom container, a receptacle, a smart container, or a tote.

Clause 14: The apparatus of any of clauses 11-13 wherein the first sensor executes a machine-learning model, and wherein the first trust value is a confidence value provided by the machine-learning model.

Clause 15: The apparatus of any of clauses 11-14 wherein the one or more sensors comprise: an accelerometer; a gyroscope; an inertial measurement unit; a humidity sensor; a temperature sensor; a light sensor; a strain sensor; or any combination thereof.

Clause 16: The apparatus of any of clauses 11-15 wherein the second trust value is less than the first trust value based at least in part on the second measurement being determined, at least in part, from the user input.

Clause 17: The apparatus of any of clauses 11-16 wherein the second trust value quantifies a degree of user involvement in obtaining the second measurement.

Clause 18: The apparatus of any of clauses 11-17 wherein the one or more processors are further configured to retrieve, from the remote data store, the first measurement, the first trust value, the second measurement, and the second trust value from the remote data store.

Clause 19: The apparatus of any of clauses 11-18 wherein the remote data store is a distributed public database, and wherein verifying the state of the item during transit comprises obtaining an output from a smart contract.

Clause 20: The apparatus of any of clauses 11-19 wherein the state of the item during transit is verified based at least in part on comparing the first measurement and the second measurement to a set of predefined criteria associated with the item.

Clause 21: A non-transitory computer-readable medium having instructions stored for verifying a state of an item during transit, wherein the instructions are configured to, when executed by one or more processors, cause the one or more processors to: obtain, from a first sensor of an apparatus configured for transit, a first measurement, the apparatus housing the item during transit; transmit, to a remote data store, the first measurement and a first trust value corresponding to the first measurement; obtain user input related to a second measurement associated with the apparatus; transmit, to the remote data store, the second measurement and a second trust value corresponding to the second measurement, the second measurement being determined, at least in part, from the user input; determine that the apparatus has reached a destination; and verify the state of the item during transit conforms to a set of predefined conditions based at least in part on the first measurement, the first trust value, the second measurement, and the second trust value.

Clause 22: The non-transitory computer-readable medium of clause 21, wherein the apparatus comprises a shipping container.

Clause 23: The non-transitory computer-readable medium of any of clauses 21-22 wherein the shipping container comprises one of a box, a conveyance, a custom container, a receptacle, a smart container, or a tote.

Clause 24: The non-transitory computer-readable medium of any of clauses 21-23 wherein the first sensor executes a machine-learning model, and wherein the first trust value is a confidence value provided by the machine-learning model.

Clause 25: The non-transitory computer-readable medium of any of clauses 21-24 wherein the first sensor is one of one or more sensors of the apparatus, and wherein the one or more sensors comprise: an accelerometer; a gyroscope; an inertial measurement unit; a humidity sensor; a temperature sensor; a light sensor; a strain sensor; or any combination thereof.

Clause 26: The non-transitory computer-readable medium of any of clauses 21-25 wherein the second trust value is less than the first trust value based at least in part on the second measurement being determined, at least in part, from the user input.

Clause 27: The non-transitory computer-readable medium of any of clauses 21-26 wherein the second trust value quantifies a degree of user involvement in obtaining the second measurement.

Clause 28: The non-transitory computer-readable medium of any of clauses 21-27 wherein the one or more processors are further configured to retrieve, from the remote data store, the first measurement, the first trust value, the second measurement, and the second trust value from the remote data store.

Clause 29: The non-transitory computer-readable medium of any of clauses 21-28 wherein the remote data store is a distributed public database, and wherein verifying the state of the item during transit comprises obtaining an output from a smart contract.

Clause 30: The non-transitory computer-readable medium of any of clauses 21-29 wherein the state of the item during transit is verified based at least in part on comparing the first measurement and the second measurement to a set of predefined criteria associated with the item.

Clause 31: An apparatus configured to verify a state of an item during transit, comprising: means for obtaining, from a first sensor of the apparatus, a first measurement, the apparatus housing the item during transit; means for transmitting, to a remote data store, the first measurement and a first trust value, the first trust value corresponding to the first measurement; means for obtaining user input related to a second measurement associated with the apparatus; means for transmitting, to the remote data store, the second measurement and a second trust value corresponding to the second measurement, the second measurement being determined, at least in part, from the user input; means for determining that the apparatus has reached a destination; and means for verifying the state of the item during transit conforms to a set of predefined conditions based at least in part on the first measurement, the first trust value, the second measurement, and the second trust value.

Clause 32: The apparatus of clause 31, wherein the apparatus comprises a shipping container.

Clause 33: The apparatus of any of clauses 31-32 wherein the first sensor executes a machine-learning model, and wherein the first trust value is a confidence value provided by the machine-learning model.

Clause 34: The apparatus of any of clauses 31-33 wherein the first sensor is one of one or more sensors of the apparatus, and wherein the one or more sensors comprise: an accelerometer; a gyroscope; an inertial measurement unit; a humidity sensor; a temperature sensor; a light sensor; a strain sensor; or any combination thereof.

Clause 35: The apparatus of any of clauses 31-34 wherein the second trust value is less than the first trust value based at least in part on the second measurement being determined, at least in part, from the user input.

Clause 36: The apparatus of any of clauses 31-35 wherein the second trust value quantifies a degree of user involvement in obtaining the second measurement.

Clause 37: The apparatus of any of clauses 31-36 wherein the apparatus further comprises means for retrieving, from the remote data store, the first measurement, the first trust value, the second measurement, and the second trust value from the remote data store.

Clause 38: The apparatus of any of clauses 31-37 wherein the remote data store is a distributed public database, and wherein verifying the state of the item during transit comprises obtaining an output from a smart contract.

Clause 39: The apparatus of any of clauses 31-38 wherein the state of the item during transit is verified based at least in part on comparing the first measurement and the second measurement to a set of predefined criteria associated with the item.

What is claimed is:

1. A method for verifying a state of an item during transit, comprising:
   obtaining, by a processor of an apparatus configured for transit from a first sensor of the apparatus, a first measurement, the apparatus housing the item during transit;
   transmitting, by the processor to a remote data store, the first measurement and a first trust value corresponding to the first measurement;
   obtaining, by the processor, user input related to a second measurement associated with the apparatus;
   transmitting, by the processor to the remote data store, the second measurement and a second trust value corresponding to the second measurement, the second measurement being determined, at least in part, from the user input;
   determining, by at least a Global Navigation Satellite System (GNSS) sensor and one or more of an accelerometer or a gyroscope of the apparatus, that the apparatus has reached a destination; and
   responsive to the determining that the apparatus has reached the destination, ensuring integrity of the item during transit by verifying, according to a smart contract, the state of the item during transit conforms to a set of predefined conditions associated with the smart contract based at least in part on the first measurement, the first trust value, the second measurement, and the second trust value;
   wherein at least the first measurement is obtained upon identifying, by the GNSS sensor, the accelerometer, the gyroscope, or a combination thereof, that the apparatus has ceased motion for a period of time during the transit.

2. The method of claim 1, wherein the apparatus comprises a shipping container.

3. The method of claim 2, wherein the shipping container comprises one of a box, a conveyance, a custom container, a receptacle, a smart container, or a tote.

4. The method of claim 1, wherein the first sensor is configured to execute a machine-learning model locally, and wherein the first trust value comprises a confidence value provided by the machine-learning model.

5. The method of claim 1, wherein the determining that the apparatus has reached the destination comprises using one or more sensors of the apparatus, the first sensor is one of the one or more sensors of the apparatus, and wherein the one or more sensors comprise:
- an inertial measurement unit;
- a humidity sensor;
- a temperature sensor;
- a light sensor;
- a strain sensor;
- a positioning sensor;
- or any combination thereof.

6. The method of claim 1, wherein the second trust value is less than the first trust value based at least in part on the second measurement being determined, at least in part, from the user input.

7. The method of claim 1, wherein the second trust value quantifies a degree of user involvement in obtaining the second measurement.

8. The method of claim 1, further comprising retrieving, from the remote data store, the first measurement, the first trust value, the second measurement, and the second trust value from the remote data store, wherein the state of the item during transit is verified by the processor of the apparatus.

9. The method of claim 1, wherein the remote data store comprises a distributed public database, and wherein verifying the state of the item during transit comprises obtaining an output from a smart contract.

10. The method of claim 1, wherein the state of the item during transit is verified based at least in part on comparing the first measurement and the second measurement to a set of predefined criteria associated with the item.

11. An apparatus configured for transit, the apparatus comprising:
- one or more sensors comprising at least a first sensor and a Global Navigation Satellite System (GNSS) sensor;
- one or more memory storing executable instructions for verifying a state of an item during transit; and
- one or more processors communicatively coupled with the one or more memory, the one or more processors being configured to:
  - obtain, from a first sensor of the apparatus, a first measurement, the apparatus housing the item during transit;
  - transmit, to a remote data store, the first measurement and a first trust value corresponding to the first measurement;
  - obtain user input related to a second measurement associated with the apparatus;
  - transmit, to the remote data store, the second measurement and a second trust value corresponding to the second measurement, the second measurement being determined, at least in part, from the user input;
  - determine, by at least the GNSS sensor and one or more of an accelerometer or a gyroscope of the apparatus, that the apparatus has reached a destination; and
  - responsive to the determination that the apparatus has reached the destination, ensure integrity of the item during transit by verifying, according to a smart contract, the state of the item during transit conforms to a set of predefined conditions associated with the smart contract based at least in part on the first measurement, the first trust value, the second measurement, and the second trust value;
  - wherein at least the first measurement is obtained upon identifying, by the GNSS sensor, the accelerometer, the gyroscope, or a combination thereof, that the apparatus has ceased motion for a period of time during the transit.

12. The apparatus of claim 11, wherein the apparatus comprises a shipping container.

13. The apparatus of claim 12, wherein the shipping container comprises one of a box, a conveyance, a custom container, a receptacle, a smart container, or a tote.

14. The apparatus of claim 11, wherein the first sensor is configured to execute a machine-learning model, and wherein the first trust value comprises a confidence value provided by the machine-learning model.

15. The apparatus of claim 11, wherein the determination that the apparatus has reached the destination comprises using the one or more sensors of the apparatus, and the one or more sensors further comprise:
- an inertial measurement unit;
- a humidity sensor;
- a temperature sensor;
- a light sensor;
- a strain sensor;
- a positioning sensor;
- or any combination thereof.

16. The apparatus of claim 11, wherein the second trust value is less than the first trust value based at least in part on the second measurement being determined, at least in part, from the user input.

17. The apparatus of claim 11, wherein the second trust value quantifies a degree of user involvement in obtaining the second measurement.

18. The apparatus of claim 11, wherein the one or more processors are further configured to retrieve, from the remote data store, the first measurement, the first trust value, the second measurement, and the second trust value from the remote data store.

19. The apparatus of claim 11, wherein the remote data store comprises a distributed public database, and wherein verifying the state of the item during transit comprises obtaining an output from a smart contract.

20. The apparatus of claim 11, wherein the state of the item during transit is verified based at least in part on comparing the first measurement and the second measurement to a set of predefined criteria associated with the item.

21. A non-transitory computer-readable medium having instructions stored for verifying a state of an item during transit, wherein the instructions are configured to, when executed by one or more processors, cause the one or more processors to:
- obtain, from a first sensor of an apparatus configured for transit, a first measurement, the apparatus housing the item during transit;
- transmit, to a remote data store, the first measurement and a first trust value corresponding to the first measurement;
- obtain user input related to a second measurement associated with the apparatus;
- transmit, to the remote data store, the second measurement and a second trust value corresponding to the second measurement, the second measurement being determined, at least in part, from the user input;
- determine, by at least a Global Navigation Satellite System (GNSS) sensor and one or more of an accelerometer or a gyroscope of the apparatus, that the apparatus has reached a destination; and
- responsive to the determination that the apparatus has reached the destination, ensure integrity of the item during transit by verifying, according to a smart contract, the state of the item during transit conforms to a set of predefined conditions associated with the smart contract based at least in part on the first measurement, the first trust value, the second measurement, and the second trust value;

wherein at least the first measurement is obtained upon identifying, by the GNSS sensor, the accelerometer, the gyroscope, or a combination thereof, that the apparatus has ceased motion for a period of time during the transit.

22. The non-transitory computer-readable medium of claim 21, wherein the apparatus comprises a shipping container.

23. The non-transitory computer-readable medium of claim 22, wherein the shipping container comprises one of a box, a conveyance, a custom container, a receptacle, a smart container, or a tote.

24. The non-transitory computer-readable medium of claim 21, wherein the first sensor configured to execute a machine-learning model, and wherein the first trust value comprises a confidence value provided by the machine-learning model.

25. The non-transitory computer-readable medium of claim 21, wherein the determination that the apparatus has reached the destination comprises using one or more sensors of the apparatus, the first sensor is one of the one or more sensors of the apparatus, and the one or more sensors comprise:
- an inertial measurement unit;
- a humidity sensor;
- a temperature sensor;
- a light sensor;
- a strain sensor;
- a positioning sensor;
- or any combination thereof.

26. The non-transitory computer-readable medium of claim 21, wherein the second trust value is less than the first trust value based at least in part on the second measurement being determined, at least in part, from the user input.

27. The non-transitory computer-readable medium of claim 21, wherein the second trust value quantifies a degree of user involvement in obtaining the second measurement.

28. The non-transitory computer-readable medium of claim 21, wherein the one or more processors are further configured to retrieve, from the remote data store, the first measurement, the first trust value, the second measurement, and the second trust value from the remote data store.

29. The non-transitory computer-readable medium of claim 21, wherein the remote data store comprises a distributed public database, and wherein verifying the state of the item during transit comprises obtaining an output from a smart contract.

30. The non-transitory computer-readable medium of claim 21, wherein the state of the item during transit is verified based at least in part on comparing the first measurement and the second measurement to a set of predefined criteria associated with the item.

31. An apparatus configured to verify a state of an item during transit, comprising:
- means for obtaining, from a first sensor of the apparatus, a first measurement, the apparatus housing the item during transit;
- means for transmitting, to a remote data store, the first measurement and a first trust value, the first trust value corresponding to the first measurement;
- means for obtaining user input related to a second measurement associated with the apparatus;
- means for transmitting, to the remote data store, the second measurement and a second trust value corresponding to the second measurement, the second measurement being determined, at least in part, from the user input;
- means for determining, by at least a Global Navigation Satellite System (GNSS) sensor and one or more of an accelerometer or a gyroscope of the apparatus, that the apparatus has reached a destination; and
- means for, responsive to determining that the apparatus has reached the destination, ensuring integrity of the item during transit by verifying, according to a smart contract, the state of the item during transit conforms to a set of predefined conditions associated with the smart contract based at least in part on the first measurement, the first trust value, the second measurement, and the second trust value;

wherein at least the first measurement is obtained upon identifying, by the GNSS sensor, the accelerometer, the gyroscope, or a combination thereof, that the apparatus has ceased motion for a period of time during the transit.

32. The apparatus of claim 31, wherein the apparatus comprises a shipping container.

33. The apparatus of claim 31, wherein the first sensor is configured to execute a machine-learning model, and wherein the first trust value comprises a confidence value provided by the machine-learning model.

34. The apparatus of claim 31, wherein the means for determining that the apparatus has reached the destination comprises means for using one or more sensors of the apparatus, the first sensor is one of the one or more sensors of the apparatus, and the one or more sensors comprise:
- an inertial measurement unit;
- a humidity sensor;
- a temperature sensor;
- a light sensor;
- a strain sensor;
- a positioning sensor;
- or any combination thereof.

35. The apparatus of claim 31, wherein the second trust value is less than the first trust value based at least in part on the second measurement being determined, at least in part, from the user input.

36. The apparatus of claim 31, wherein the second trust value quantifies a degree of user involvement in obtaining the second measurement.

37. The apparatus of claim 31, wherein the apparatus further comprises means for retrieving, from the remote data store, the first measurement, the first trust value, the second measurement, and the second trust value from the remote data store.

38. The apparatus of claim 31, wherein the remote data store comprises a distributed public database, and wherein verifying the state of the item during transit comprises obtaining an output from a smart contract.

39. The apparatus of claim 31, wherein the state of the item during transit is verified based at least in part on comparing the first measurement and the second measurement to a set of predefined criteria associated with the item.

* * * * *